United States Patent

Hampikian

(10) Patent No.: US 9,383,442 B2
(45) Date of Patent: Jul. 5, 2016

(54) RADAR SYSTEM AND METHOD FOR DETERMINING RANGE, RELATIVE VELOCITY AND BEARING OF AN OBJECT USING CONTINUOUS-WAVE AND CHIRP SIGNALS

(71) Applicant: Autoliv ASP, Inc., Ogden, UT (US)

(72) Inventor: Paul Hampikian, Lowell, MA (US)

(73) Assignee: Autoliv ASP, Inc., Ogden, UT (US)

(*) Notice: Subject to any disclaimer, the term of this patent is extended or adjusted under 35 U.S.C. 154(b) by 239 days.

(21) Appl. No.: 14/274,955

(22) Filed: May 12, 2014

(65) Prior Publication Data

US 2015/0323660 A1    Nov. 12, 2015

(51) Int. Cl.
| | |
|---|---|
| G01S 13/58 | (2006.01) |
| G01S 7/35 | (2006.01) |
| G01S 13/32 | (2006.01) |
| G01S 13/34 | (2006.01) |
| G01S 13/536 | (2006.01) |

(Continued)

(52) U.S. Cl.
CPC .......... *G01S 13/58* (2013.01); *G01S 7/354* (2013.01); *G01S 13/32* (2013.01); *G01S 13/345* (2013.01); *G01S 13/536* (2013.01); *G01S 13/584* (2013.01); *G01S 13/42* (2013.01); *G01S 13/931* (2013.01)

(58) Field of Classification Search
CPC ....... G01S 13/32; G01S 13/345; G01S 13/42; G01S 13/536; G01S 13/58; G01S 13/584; G01S 13/931; G01S 7/354
USPC ....................................................... 342/109
See application file for complete search history.

(56) References Cited

U.S. PATENT DOCUMENTS

| | | | |
|---|---|---|---|
| 3,149,326 | A | 9/1964 | Naidich |
| 5,963,163 | A | 10/1999 | Kemkemian et al. |

(Continued)

FOREIGN PATENT DOCUMENTS

| | | |
|---|---|---|
| EP | 2141510 | 1/2010 |
| JP | 2006300536 | 11/2006 |

OTHER PUBLICATIONS

International Search Report mailed Jul. 20, 2015 in corresponding PCT Application No. PCT/US2015/029002, filed May 4, 2015.

(Continued)

*Primary Examiner* — Timothy A Brainard
(74) *Attorney, Agent, or Firm* — Burns & Levinson, LLP; Steven M. Mills

(57) ABSTRACT

Determining distance and relative speed includes a transmitter transmitting electromagnetic signals defined by a plurality of sections, a first section comprising a continuous-wave (CW) signal, a second section comprising a chirp electromagnetic signal, the chirp electromagnetic signal comprising a plurality of subsections. A detector detects reflected signals being the transmitted electromagnetic signals reflected from an object, and comprising a reflected CW signal and a reflected chirp signal. The detector detects the reflected signals by: (i) generating a plurality of samples of the reflected CW signal, and (ii) generating a plurality of samples of the reflected chirp signal. A processor determines a first set of phase differences among the plurality of samples of the reflected CW signal and a second set of phase differences among the plurality of samples of the reflected chirp signal, and processes the first and second sets of phase differences to determine the distance, relative speed and bearing.

18 Claims, 13 Drawing Sheets

(51) Int. Cl.
*G01S 13/42* (2006.01)
*G01S 13/93* (2006.01)

(56) References Cited

U.S. PATENT DOCUMENTS

| | | | |
|---|---|---|---|
| 6,864,832 B2 | 3/2005 | Mende et al. | |
| 2004/0252047 A1* | 12/2004 | Miyake | G01S 13/34 342/107 |
| 2008/0088500 A1 | 4/2008 | Ishii et al. | |

OTHER PUBLICATIONS

Hermann Rohling, et al., "Radar Waveform for Automotive Radar Systems and Applications," IEEE 2008.
Yingrui Hu, et al., "Study on Non-linear Stepped Chirp Radar System," IEEE 2008.
Hermann Rohling, et al., "77 GHz Sensor for Car Application," International Radar Conference, May 8, 1995.
Werner Wiesbeck, "Lecture Script Radar System Engineering," 13th Edition WS2006/2007, Sep. 14, 2006.

\* cited by examiner

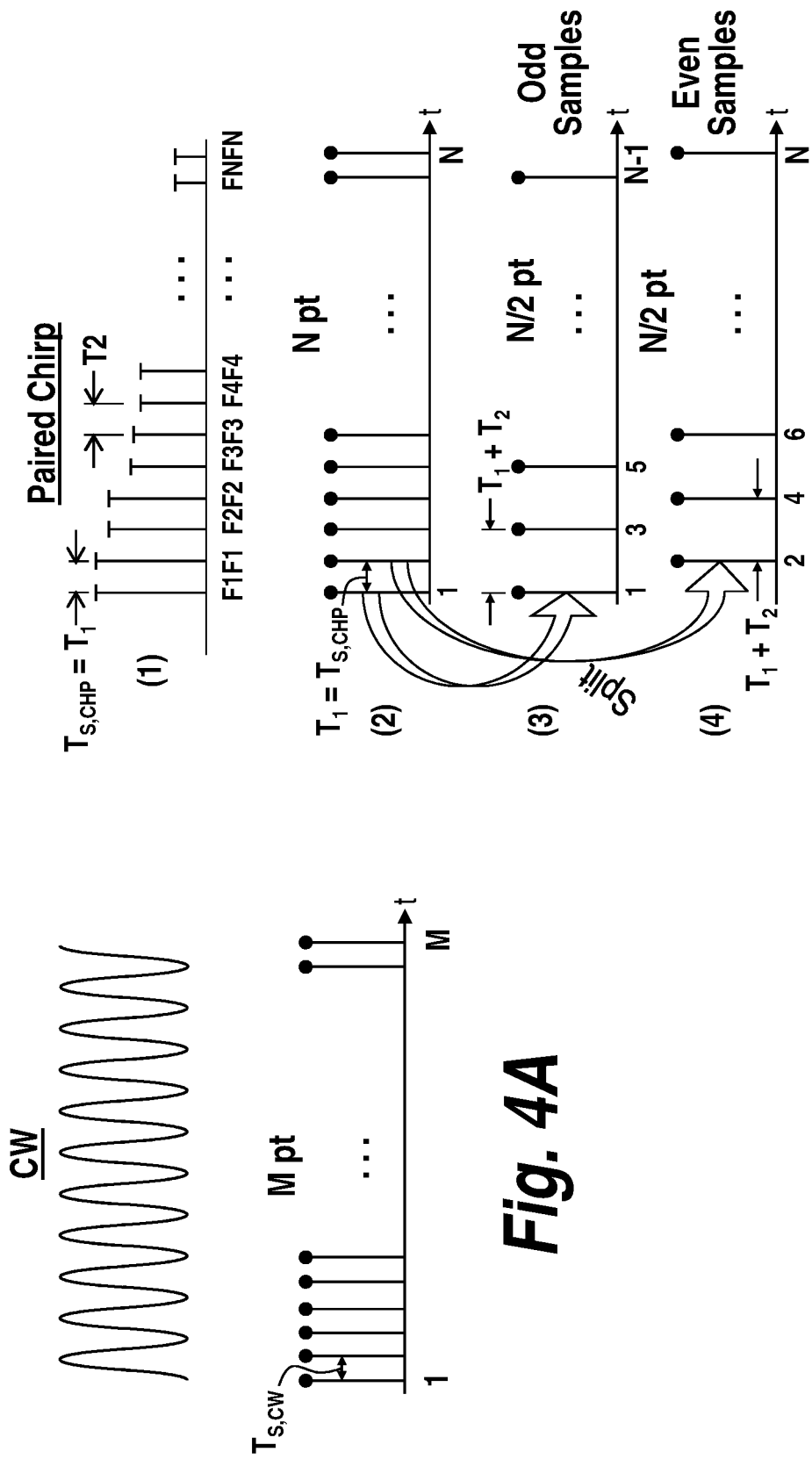

CW

|X(f)|

Target Dopplers

V1 — K1
V2 — K2
V3 — K3
(FFT bin)
f

Fig. 5A

Split Chirps

Chirp A (Odd)

|X(f)|

R+V Coupled Targets

P1 — K1
P2 — K2
P3 — K3
(1) (FFT bin)
f

Chirp B (Even)

|X(f)|

P1 — K1
P2 — K2
P3 — K3
(2) (FFT bin)
f

Fig. 5B

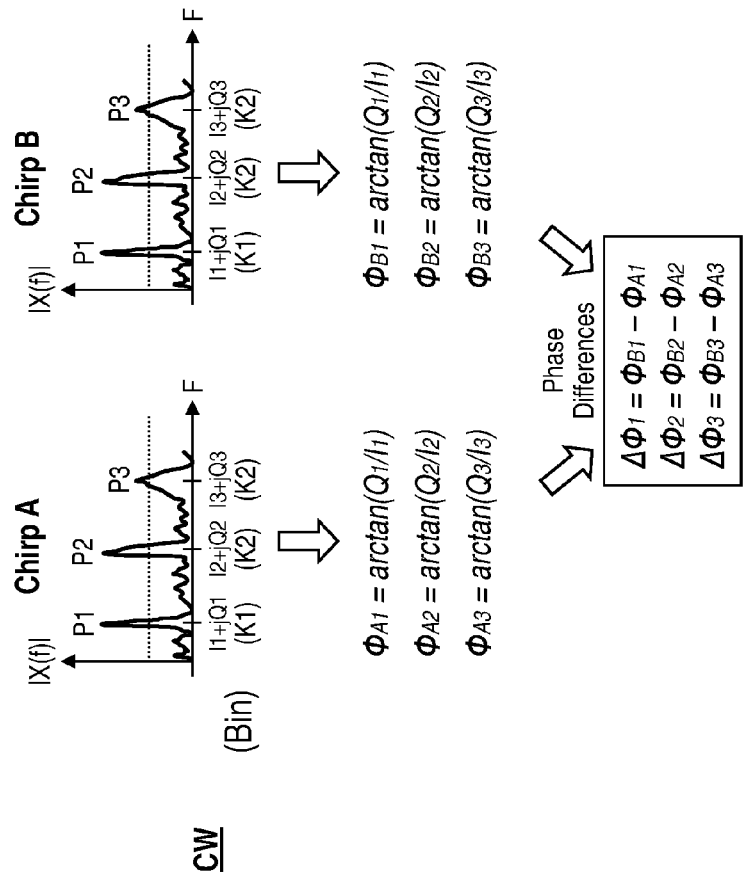
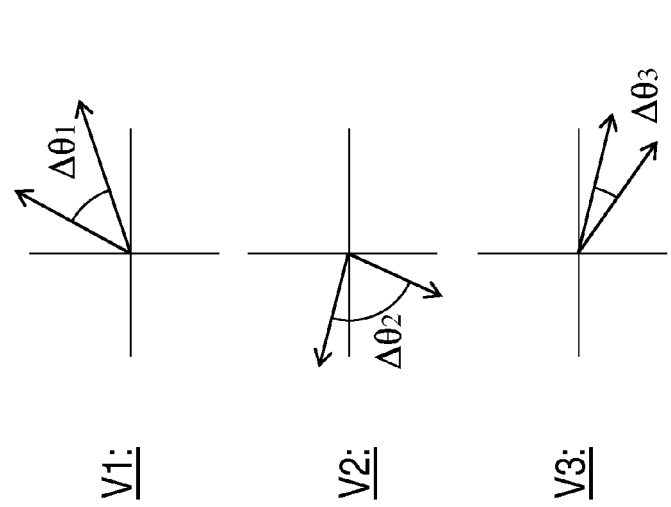
Fig. 8
Fig. 7

|    | V1 | V2 | V3 |
|----|----|----|----|
| P1 | $|\Delta\Phi_1 - \Delta\theta_1|$ | $|\Delta\Phi_1 - \Delta\theta_2|$ | $|\Delta\Phi_1 - \Delta\theta_3|$ |
| P2 | $|\Delta\Phi_2 - \Delta\theta_1|$ | $|\Delta\Phi_2 - \Delta\theta_2|$ | $|\Delta\Phi_2 - \Delta\theta_3|$ |
| P3 | $|\Delta\Phi_3 - \Delta\theta_1|$ | $|\Delta\Phi_3 - \Delta\theta_2|$ | $|\Delta\Phi_3 - \Delta\theta_3|$ |

*Fig. 9*

RADAR SYSTEM AND METHOD FOR DETERMINING RANGE, RELATIVE VELOCITY AND BEARING OF AN OBJECT USING CONTINUOUS-WAVE AND CHIRP SIGNALS

BACKGROUND

1. Technical Field

This disclosure relates to radar systems and methods, and, more particularly, to radar systems and methods using a modified radar signal and signal processing approach to determine relative velocity (Doppler), range and bearing of one or more objects, including simultaneous determination of relative velocity, range and bearing of multiple objects.

2. Discussion of Related Art

In a typical radar system, a transmitter transmits an electromagnetic signal from an observation point, and a receiver located at or near the observation point receives an echo signal, or reflected signal, from an object. The echo signal or reflected signal is the result of the transmitted electromagnetic signal striking the object and being reflected by the object back to the receiver. Processing of the echo or reflected signals can be performed to determine certain parameters related to the remote object, such as, for example, relative distance or radial range, relative velocity or Doppler and direction or bearing of the object with respect to the observation point.

At least two types of signals can typically be used in radar systems, namely, continuous-wave (CW) signals and chirp signals. A CW signal is generated at a single frequency. Multiple samples of the CW signal reflected from the object are taken at the receiver. The samples are typically processed to determine relative velocity of the object by detecting phase differences or phase rotations, i.e., Doppler shifts, in the reflected CW signal.

A chirp signal is an electromagnetic signal whose frequency changes with time. Generally, the frequency of an up-chirp signal increases over time, and the frequency of a down-chirp signal decreases over time. The frequency variation of a chirp signal can take many different forms. For example, the frequency of a linear frequency modulated (LFM) signal varies linearly. Other forms of frequency variations in chirp signals include exponential variations. A single pass through a chirp signal from beginning to end is commonly referred to as a "sweep."

In addition to these latter types of chirp signals in which the frequency varies continuously according to some predetermined function, i.e., linear or exponential, chip signals can also be generated as step-chirp signals in which the frequency changes in steps. That is, a typical step-chirp signal includes multiple steps in frequency, where the frequency is constant for some predetermined time duration at each step. The step-chirp signal can also be pulsed on and off, with the pulse being on during some predetermined time period during each step of the chirp sweep. In typical step-chirp radar signal processing, object range, relative velocity and bearing information can be obtained. However, it can be difficult to eliminate ambiguities among range and velocity information, particularly in the presence of multiple objects.

SUMMARY

According to one aspect of the present disclosure, a method for determining parameters of an object with respect to an observation point is provided. According to the method, electromagnetic signals are transmitted from the observation point. The electromagnetic signals are defined by a plurality of sections, a first section of the electromagnetic signals comprising a continuous-wave (CW) electromagnetic signal, and a second section of the electromagnetic signals comprising a chirp electromagnetic signal. The chirp electromagnetic signal comprises a plurality of subsections divided in time. Reflected signals are detected, the reflected signals being the transmitted electromagnetic signals reflected from the object. The reflected signals comprise a reflected CW signal being the CW electromagnetic signal reflected from the object and a reflected chirp signal being the chirp electromagnetic signal reflected from the object. Detecting the reflected signals comprises generating a plurality of samples of the reflected CW signal and generating a plurality of samples of the reflected chirp signal. A first set of phase differences among the plurality of samples of the reflected CW signal is determined. A second set of phase differences among the plurality of samples of the reflected chirp signal is determined. The first and second sets of phase differences are processed to determine the distance and relative speed of the object.

In some exemplary embodiments, the method further comprises performing Fourier transformations on the first and second pluralities of samples and using peaks in the Fourier transformations to determine the first and second sets of phase differences. In some exemplary embodiments, the Fourier transformations comprise a Fast Fourier Transform (FFT).

In some exemplary embodiments, the chirp electromagnetic signal and the reflected chirp signal each comprise a plurality of respective associated subsections, each subsection of the reflected chirp signal is associated with a pair of consecutive samples of the reflected chirp signal, each sample of the pair of consecutive samples of the reflected chirp signal being respectively associated with a pair of transmitted signals of the same frequency of the associated subsection. In some exemplary embodiments, the plurality of samples of the reflected chirp signal comprises a set of odd chirp samples comprising alternating samples of the plurality of samples of the reflected chirp signal and a set of even chirp samples comprising alternating samples of the plurality of samples of the reflected chirp signal, with a time delay existing between the set of odd chirp samples and the set of even chirp samples. In some exemplary embodiments, determining the second set of phase differences among the plurality of samples of the reflected chirp signal comprises determining phase differences among the set of odd chirp samples and the set of even chirp samples.

In some exemplary embodiments, the method further comprises using a velocity value associated with the object in determining the first set of phase differences. In some exemplary embodiments, the method further comprises using the velocity value associated with the object and the second set of phase differences to generate a range value associated with the object. In some exemplary embodiments, the method further comprises generating a bearing value associated with the object.

According to another aspect of the present disclosure, an apparatus for determining distance and relative speed of an object with respect to an observation point is provided. A transmitter transmits electromagnetic signals from the observation point. The electromagnetic signals are defined by a plurality of sections, a first section of the electromagnetic signals comprising a continuous-wave (CW) electromagnetic signal, and a second section of the electromagnetic signals comprising a chirp electromagnetic signal. The chirp electromagnetic signal comprises a plurality of subsections divided in time. A detector detects reflected signals, the reflected signals being the transmitted electromagnetic signals reflected from the object. The reflected signals comprise a reflected CW signal being the CW electromagnetic signal reflected from the object and a reflected chirp signal being the chirp electromagnetic signal reflected from the object. The detector detects the reflected signals by generating a plurality of samples of the reflected CW signal and generating a plurality of samples of the reflected chirp signal. A processor determines a first set of phase differences among the plurality of samples of the reflected CW signal and a second set of phase differences among the plurality of samples of the reflected chirp signal. The processor processes the first and second sets of phase differences to determine the distance and relative speed of the object.

In some exemplary embodiments, the processor performs Fourier transformations on the first and second pluralities of samples and uses peaks in the Fourier transformations to determine the first and second sets of phase differences. In some exemplary embodiments, the Fourier transformations comprise a Fast Fourier Transform (FFT).

In some exemplary embodiments, the chirp electromagnetic signal and the reflected chirp signal each comprise a plurality of respective associated subsections, each subsection of the reflected chirp signal is associated with a pair of consecutive samples of the reflected chirp signal, each sample of the pair of consecutive samples of the reflected chirp signal being respectively associated with a pair of transmitted signals of the same frequency of the associated subsection. In some exemplary embodiments, the plurality of samples of the reflected chirp signal comprises a set of odd chirp samples comprising alternating samples of the plurality of samples of the reflected chirp signal and a set of even chirp samples comprising alternating samples of the plurality of samples of the reflected chirp signal, with a time delay existing between the set of odd chirp samples and the set of even chirp samples. In some exemplary embodiments, the processor determines the second set of phase differences among the plurality of samples of the reflected chirp signal by determining phase differences among the set of odd chirp samples and the set of even chirp samples.

In some exemplary embodiments, the processor determines the first set of phase differences using a velocity value associated with the object. In some exemplary embodiments, the processor uses the velocity value associated with the object and the second set of phase differences to generate a range value associated with the object. In some exemplary embodiments, the processor generates a bearing value associated with the object.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

FIGS. 4A and 4B are schematic diagrams which illustrate the sampling of the returns or reflected signals or echo signals received and processed according to some exemplary embodiments. Specifically, FIG. 4A schematically illustrates the sampling of the returns due to the first section or CW section of the transmitted signal, and FIG. 4B illustrates the sampling of the returns due to the second section or paired chirp section of the transmitted signal.

FIG. 5A includes a schematic graphical representation of illustrative exemplary results of applying an FFT to a set of CW samples, according to some exemplary embodiments.

FIG. 5B includes schematic graphical representations of illustrative exemplary results of applying an FFT to two sets of split chirp samples, according to some exemplary embodiments.

FIG. 7 includes a schematic diagram which illustrates determination of individual target phase rotations or phase differences that the chirp targets would experience from Doppler velocities in the returns or reflected signals or echo signals from the CW first section of the radar transmitted signal, according to some exemplary embodiments.

FIG. 8 includes a schematic diagram which illustrates determination of individual phase differences among the returns or reflected signals or echo signals from the chirp second section of the radar transmitted signal, according to some exemplary embodiments.

FIG. 9 includes a schematic diagram including a table which illustrates the comparison between the phase rotations determined from the CW returns and the phase differences determined from the chirp returns.

DETAILED DESCRIPTION

Figure 1:
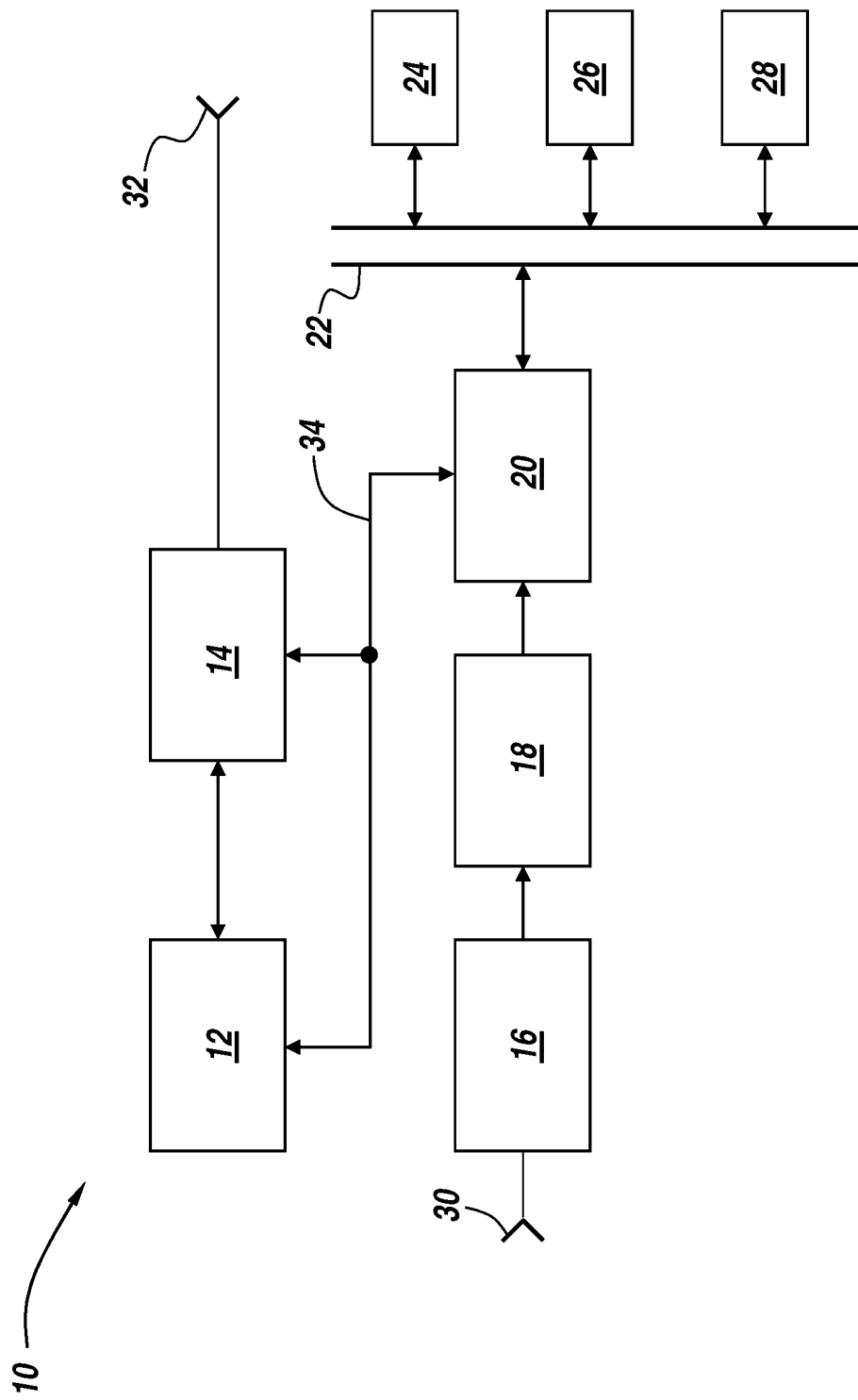
FIG. 1 includes a schematic block diagram of a radar system for processing radar signals, for example, automobile radar signals, in accordance with some exemplary embodiments.

FIG. 1 includes a schematic block diagram of a radar system 10 for processing radar signals, for example, automobile radar signals, in accordance with some exemplary embodiments. Referring to FIG. 1, radar system 10 generates and transmits radar signals into a region that is being monitored by radar system 10. Generation and transmission of signals is accomplished by RF signal generator 12, radar transmit circuitry 14 and transmit antenna 32. Radar transmit circuitry 14 generally includes any circuitry required to generate the signals transmitted via transmit antenna 32, such as pulse shaping circuitry, transmit trigger circuitry, RF switch circuitry, or any other appropriate transmit circuitry used by radar system 10. RF signal generator 12 and radar transmit circuitry 14 can be controlled via a processor 20 issuing commands and control signals via control lines 34, such that the desired RF signal having the desired configuration and signal parameters is transmitted at transmit antenna 32.

Radar system 10 also receives returning radar signals, referred to herein as "returns" or "echo signals" or "reflected signals," at radar receive and analog processing circuitry 16 via receive antenna 30. Radar receive and analog processing circuitry 16 generally includes any circuitry required to process the signals received via receive antenna 30, such as signal splitting, mixing, heterodyne and/or homodyne conversion, amplification, filtering, receive signal triggering, signal switching and routing, and/or any other appropriate radar signal receive functions carried out by radar system 10. As a result, radar receive and analog processing circuitry 16 generates one or more analog signals, such as inphase (I) and quadrature (Q) analog signals, processed by radar system 10. The resulting analog signals are transmitted to and digitized by analog-to-digital converter circuitry (ADC) 18. The digitized signals are then forwarded to processor 20 for radar signal processing as described herein in detail.

Processor 20 can be one of various types of processors capable of carrying out the processing on the digitized receive signals and control of RF signal generator 12 and radar transmit circuitry 14 to provide the radar operation and functionality of radar system 10, as described herein in detail. As such, processor 20 can be a digital signal processor (DSP), microprocessor, microcontroller, or other such device. In order to carry out the radar operation and functionality of radar system 10, processor 20 interfaces via a system bus 22 with one or more other required circuits, such as one or more memory devices 24 of one or more types of memory, generally identified by reference numeral 24; any required peripheral circuitry, generally identified by reference numeral 26; and any required input/output circuitry, generally identified by reference numeral 28.

As described above, processor 20 can interface with RF signal generator 12 and radar transmit circuitry 14 via control lines 34. In alternative embodiments, RF signal generator 12 and/or radar transmit circuitry 14 can be connected to bus 22 such that they can communicate with one or more of processor 20, memory devices 24, peripheral circuitry 26 and input/output circuitry 28 via bus 22.

According to exemplary embodiments, range, bearing and relative velocity of an object or target, whether moving or stationary, can be determined. Unique pairings of range and velocity of objects or targets are associated without generating ghost targets, i.e., indication of one or more targets where no target is present.

According to exemplary embodiments, the transmitted electromagnetic radar signal includes two sequential sections. The first section includes a continuous-wave (CW) signal having a constant frequency over a predetermined duration of time. The second section includes a stepped-chirp signal, which includes a plurality of stepped-frequency pulses, each pulse having a fixed frequency, transmitted over a predetermined time duration and frequency bandwidth. The stepped-chirp signal of the second section can be referred to as a stepped, frequency-modulated (FM) signal. In this chirp signal, within each pulse step, the pulse frequency is maintained constant over the duration of the pulse. The multiple pulses in the chirp signal are shifted in time relative to each other. That is, the signal frequency within each step pulse is constant, and the time spacing between successive pulses within each step is also constant.

It should be noted that, throughout this disclosure, the CW section of the transmitted electromagnetic radar signal is described and illustrated as preceding the stepped-chirp section in time. It should be noted that this is a choice based merely on arbitrary convention and ease of description. In accordance with the present disclosure, the temporal ordering of the sections of the transmitted electromagnetic signal is not critical to the exemplary embodiments.

According to the exemplary embodiments, detection is performed on a sweep-by-sweep basis, in which a sweep includes transmission of both sections of the transmitted electromagnetic signal and reception of both sections of the transmitted electromagnetic signal reflected back to the receiver. The signal processing of each sweep results in a single range, bearing and velocity measurement for all detected object/target returns or reflected signals.

Range and velocity determination is accomplished by analyzing the individual frequency spectra of the CW section returns and the chirp section returns. The approach includes generating Fast Fourier Transforms (FFT) of the return for the CW section and detecting all Doppler peaks above a predetermined threshold.

The stepped-chirp (stepped FM) return is then de-interleaved and separated into two signals composed of even and odd time samples. The two time samples represent the returns from two identical frequency-stepped chirps that are separated in time by one sample interval. This is referred to herein as "split chirp" samples. FFTs are generated for both of the split-chirp samples. The FFTs are referred to herein as FFT1 and FFT2. A phase measurement is made in each FFT bin in which a peak is found. The phase difference between corresponding peaks in FFT1 and FFT2 is compared to the calculated phase rotation over one chirp sample interval, $T_{S,CHP}$, for each velocity found in the CW Doppler detection. The closest match is the correct range/velocity pair. Ghosting, in which non-existent targets are identified, is eliminated. Further qualification of match can also conditioned on other criteria such as a maximum allowed phase difference and a minimum SNR.

Once a pair is established, range for each object/target can be determined by removing the number of FFT bins due to velocity from the FFT index of the peak. The resulting index is then due solely to range. The range value is the new index multiplied by the range resolution of the chirp. This process is repeated until all peaks in the chirp signal returns are processed. The result is a range and velocity pair for all object/target returns in the current sweep.

According to exemplary embodiments, bearing determination is performed on the matched peaks. Once a range/velocity pair has been established, bearing is measured from the original stepped chirp (stepped FM) returns. Each object's bearing can be calculated interferometrically from the round-trip phase difference between antenna elements or beam-formed beams and the known geometry of the antenna array. Since the FFT bin phase is also proportional to the round-trip path length differences between antenna elements or beam-formed beams, a bearing calculation can be made for each successfully paired object.

Figure 2:
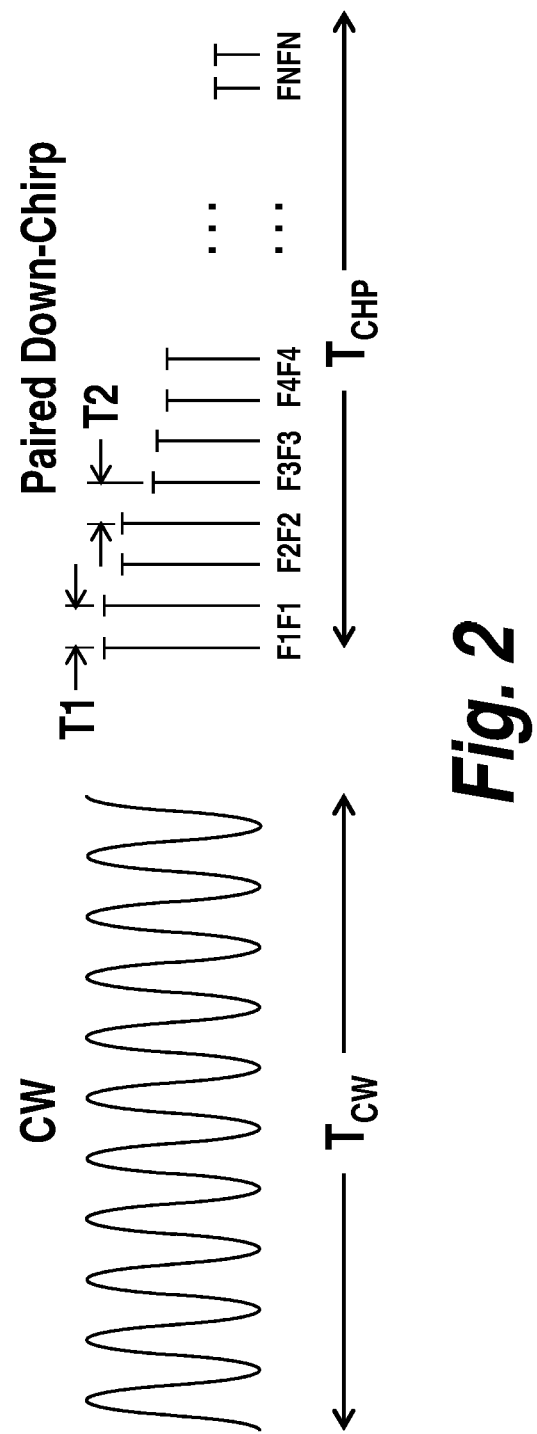
FIG. 2 is a schematic diagram which illustrates a transmitted electromagnetic radar signal, according to some exemplary embodiments.

FIG. 2 is a schematic diagram which illustrates a transmitted electromagnetic radar signal, according to some exemplary embodiments. Referring to FIG. 2, the transmitted signal includes a first section, which includes a continuous-wave signal, labeled CW, at a constant frequency of $F_C$ and a time duration $T_{CW}$. The transmitted signal also includes a second section during which a chirp signal according to some exemplary embodiments is transmitted. The chirp signal of the second section of the transmitted signal is illustrated in FIG. 2 as a paired stepped down-chirp. As a down-chirp, the frequency of the signal decreases with time. It will be understood that, in accordance with other exemplary embodiments, the chirp signal need not be a down-chirp signal. For example, in some alternative exemplary embodiments, the chirp signal can be an up-chirp signal, in which the frequency of the signal increases with time.

In the paired chirp-signal of FIG. 2, at each frequency step, i.e., F1, F2, ..., FN, there exist at least two consecutive instances of the signal. That is, as illustrated in FIG. 2, the paired down-chirp signal can be represented as a series of pairs of pulses, with each pulse in a pair of pulses being at the same frequency. Thus, for the exemplary embodiment illustrated in FIG. 2, the stepped paired down-chirp signal includes N steps, with two pulses or instances of each of N frequencies occurring at each step. Specifically, the frequencies of the pulses or instances of the signal at the first step are indicated as F1F1, the frequencies of the pulses or instances of the signal at the second step are indicated as F2F2, the frequencies of the pulses or instances of the signal at the third step are indicated as F3F3, the frequencies of the pulses or instances of the signal at the fourth step are indicated as F4F4, and the frequencies of the pulses or instances of the signal at the Nth step are indicated as FNFN. The duration in time of the second section of the transmitted signal, which includes the entire stepped paired down-chirp signal, is indicated as $T_{CHP}$.

Referring to FIG. 2, it is also noted that, in the illustrated exemplary embodiment, in the paired down chirp signal, each like frequency instance or pulse is separated in time by a constant time T1. That is, the two F1 instances or pulses are separated by time T1, the two F2 instances or pulses are separated by time T1, etc. Also, contiguous pairs of like-frequency instances or pulses are separated by a time T2. That is, the second F1 instance or pulse and the first F2 instance or pulse are separated by time T2, the second F2 instance or pulse and the first F3 instance or pulse are separated by time T2, etc. In this particular exemplary embodiment, the time periods T1 and T2 can be equal, such that all time-adjacent frequency pulses or instances are spaced equally in time. In other exemplary embodiments, as described below in detail in connection with FIGS. 12A and 12B, T1 and T2 need not be the same.

Figure 3A:
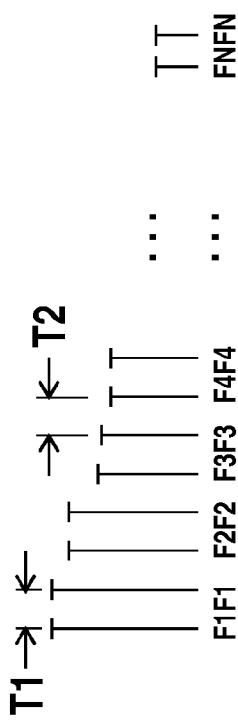
FIG. 3A is a schematic waveform diagram of the paired down-chirp signal illustrated in FIG. 2.
Figure 3C:
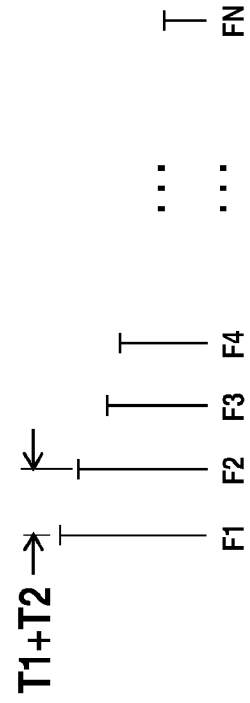
FIGS. 3B and 3C include schematic waveform diagrams illustrating the de-interleaved or "split" chirp signals which, when interleaved in time, form the complete paired down-chirp signal of FIG. 3A.
Figure 3B:
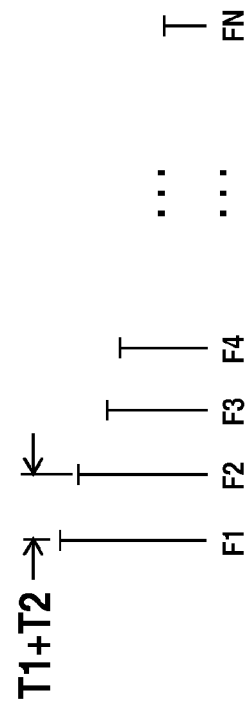

In some exemplary embodiments, the processing of returns or reflected or echo signals from one or more objects or targets considers the stepped paired chirp signal to be two identical chirp signals shifted in time and interleaved with each other. This interleaving of two identical chirp signals is illustrated in FIGS. 3A through 3C. FIG. 3A is a schematic waveform diagram of the paired down-chirp signal illustrated in FIG. 2. FIGS. 3B and 3C include schematic waveform diagrams illustrating the de-interleaved or "split" chirp signals which, when interleaved in time, form the complete paired down-chirp signal of FIG. 3A. As illustrated in FIGS. 3B and 3C, the first split chirp signal, referred to as "split chirp A," is identical to the second split chirp signal, referred to as "split chirp B." Both consist of pulses or instances of the signal at the series of frequencies F1, F2, F3, F4, ..., FN. In the processing of the returns from these split chirp signals, the only difference between them is the time shift between them.

Referring to FIGS. 3A through 3C, as described in detail above, each like frequency instance or pulse is separated in time by a constant time T1. That is, the two F1 instances or pulses are separated by time T1, the two F2 instances or pulses are separated by time T1, etc. Also, contiguous pairs of like-frequency instances or pulses are separated by a time T2. That is, the second F1 instance or pulse and the first F2 instance or pulse are separated by time T2, the second F2 instance or pulse and the first F3 instance or pulse are separated by time T2, etc. As a result, in the split chirp signals of FIGS. 3B and 3C, time-adjacent pulses or instances are separated in time by a time T1+T2. In the particular exemplary embodiment in which the time periods T1 and T2 are equal, time-adjacent pulses or instances in the split chirp signals are separated in time by a time 2(T1)=2(T2).

FIGS. 4A and 4B are schematic diagrams which illustrate the sampling of the returns or reflected signals or echo signals received and processed according to some exemplary embodiments. Specifically, FIG. 4A schematically illustrates the sampling of the returns due to the first section or CW section of the transmitted signal, and FIG. 4B illustrates the sampling of the returns due to the second section or paired chirp section of the transmitted signal.

Referring to FIG. 4A, samples are taken of the reflected CW signal periodically. In some exemplary embodiments, M samples are taken at a sampling period $T_{S,CW}$.

Referring to FIG. 4B, sampling of the reflected chirp signal, i.e., the reflected split chirp signals, is illustrated. The waveform labeled (1) is the transmitted complete paired down-chirp signal. The waveform labeled (2) is the N-point set of interleaved samples. The waveform labeled (3) is a first set of samples of the first de-interleaved split chirp signal. In the illustrated exemplary embodiment, samples of the paired down-chirp signal are taken at a chirp sampling period $T_{S,CHP}$. In the particular exemplary embodiment illustrated in FIG. 4B, $T_{S,CHP}$ is equal to T1.

Continuing to refer to FIG. 4B, in this particular exemplary embodiment, by arbitrary convention, the first set of samples of the split chirp is referred to as an odd chirp (from split chirp A), in that it includes N/2 samples of the stepped down-chirp signal returns which have odd-numbered indices, i.e., 1, 3, 5, ..., N−1. The waveform labeled (4) is a second set of samples of the second de-interleaved split chirp signal. In this particular exemplary embodiment, by arbitrary convention, the second set of samples of the split chirp is referred to as an even chirp (from split chirp B), in that it includes N/2 samples of the stepped down-chirp signal returns which have even-numbered indices, i.e., 2, 4, 6, ..., N. It should be noted that, according to the exemplary embodiments, processing includes the use of radix-2 FFTs, such that, in these exemplary embodiments, there is always an even quantity of samples.

Continuing to refer to FIG. 4B, it should be noted that, as described above in connection with FIGS. 3A through 3C, each like-frequency instance or pulse is separated in time by constant time T1. That is, the two F1 instances or pulses are separated by time T1, the two F2 instances or pulses are separated by time T1, etc. Also, contiguous pairs of like-frequency instances or pulses are separated by a time T2. That is, the second F1 instance or pulse and the first F2 instance or pulse are separated by time T2, the second F2 instance or pulse and the first F3 instance or pulse are separated by time T2, etc. As a result, in the split chirp signals of signals (3) and (4) of FIG. 4B, time-adjacent pulses or instances are separated in time by a time T1+T2. In the particular exemplary embodiment in which the time periods T1 and T2 are equal, time-adjacent pulses or instances in the split chirp signals are separated in time by a time 2(T1)=2(T2).

The samples generated as illustrated in FIGS. 4A and 4B are processed by the circuitry illustrated in FIG. 1 in connection with the exemplary embodiments as described herein.

That is, the samples obtained of the CW signal returns illustrated in FIG. 4A and the samples of the odd and even split chirp returns illustrated in waveforms (3) and (4) respectively in FIG. 4B, are processed according to the exemplary embodiments.

In some exemplary embodiments, the CW samples illustrated schematically in FIG. 4A are applied to a Fourier transformation, preferably, a radix-2 FFT, to generate a frequency spectrum associated with the returns for the CW portion of the transmitted signal. FIG. 5A includes a schematic graphical representation of illustrative exemplary results of applying the FFT to a set of CW samples, according to illustrative exemplary embodiments. Referring to FIG. 5A, in this exemplary illustration, the returns illustrate three frequency bin peaks in the FFT, which would correspond to three respective Dopplers of moving objects or targets indicated in the returns. Specifically, the three peaks occur in frequency bins K1, K2 and K3. It will be understood that the present disclosure is applicable to any number of peaks and that three peaks are chosen arbitrarily to illustrate the exemplary embodiments. According to known FFT radar processing techniques, these three peaks correspond to three object Dopplers, indicated as V1, V2 and V3. In general, there can exist multiple targets or objects with the same Doppler. According to the exemplary embodiments, this ambiguity is resolved to unambiguously identify relative velocity, range and bearing of multiple objects or targets.

In some exemplary embodiments, the odd and even split-chirp samples illustrated schematically in FIG. 4B are also applied to a Fourier transformation, preferably, a radix-2 FFT, to generate frequency spectra associated with the returns for the two split chirps, i.e., split chirp A and split chirp B. FIG. 5B includes schematic graphical representations of illustrative exemplary results of applying the FFT to two sets of split chirp samples, namely, odd samples for split chirp A and even samples for split chirp B, according to illustrative exemplary embodiments.

Referring to FIG. 5B, the FFT results for the odd samples of split chirp A are illustrated in the waveform labeled (1), and the FFT results for the even samples of split chirp B are illustrated in the waveform labeled (2). Once again, in this exemplary illustration, the returns illustrate three frequency bin peaks in each of the FFTs, which would correspond to moving objects or targets indicated in the returns. As noted above, it will be understood that the present disclosure is applicable to any number of peaks and that three peaks are chosen arbitrarily to illustrate the exemplary embodiments. Specifically, for both of chirp A and chirp B, the three peaks P1, P2 and P3 occur in frequency bins K1, K2 and K3, respectively. It should be noted that, although the commonly-used notation K is used herein to indicate FFT bin index, it will be readily understood by one of skill in the art that the bin indices, i.e., K, in the CW FFT of FIG. 5A may not be the same as the bin indices, i.e., K, in the chirp FFTs of FIG. 5B due to different sample rates and integration times. However, the bin indices in the split chirps of FIG. 5B will most always be the same given the negligible acceleration and displacement of vehicle dynamics within one sample interval, $T_{S,CHP}$. According to known FFT radar processing techniques, each of the FFT bins for the chirp returns is associated with a target range and a target velocity. Hence, each peak P1, P2 and P3 is associated with some combination of range and velocity for the associated object(s)/target(s). That is, each peak in each FFT corresponds to object(s)/target(s) having coupled velocity and range information. Since each bin is a combination of range and velocity information, in a conventional radar system, neither the velocity nor the range of an object can be unambiguously resolved. However, according to the exemplary embodiments, this ambiguity is resolved such that values for range and velocity of a target are unambiguously determined.

Figure 6:
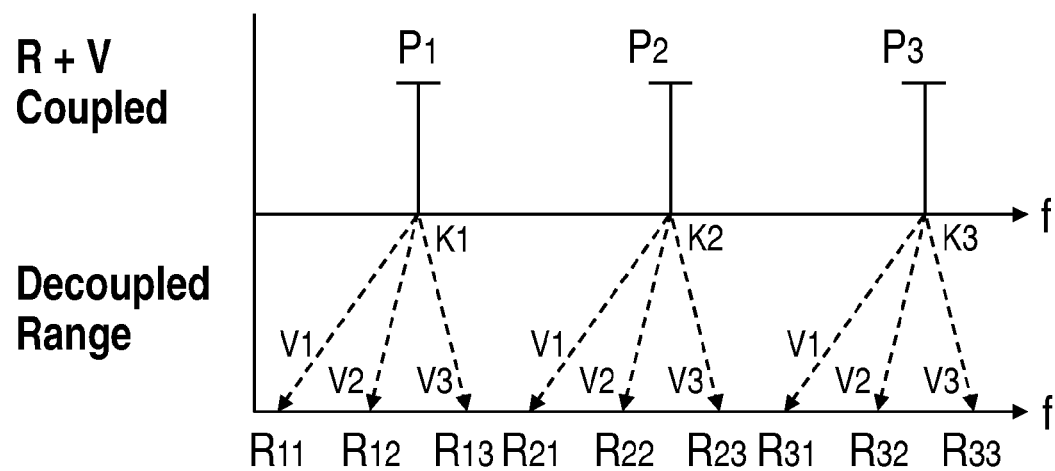
FIG. 6 includes a schematic illustration of the result of applying a FFT and the results of decoupling velocity in the return samples for the complete interleaved paired chirp signal, as illustrated in FIG. 4B.

FIG. 6 includes a schematic illustration of the result of applying Fourier transformation, e.g., a Fast Fourier Transform (FFT), to the return samples for the complete interleaved paired chirp signal, as illustrated in FIG. 4B. That is, the waveform of FIG. 6 shows the peaks for the combined paired chirp returns, resulting from the combination of the odd chirp (chirp A) samples and the even chirp (chirp B) samples. Referring to FIG. 6, in the illustrative exemplary embodiment described herein, the FFT of the complete paired chirp returns results in, for example, the three peaks P1, P2 and P3, which again correspond to objects/targets in the returns. As noted in the top portion of the schematic diagram of FIG. 6, the peaks P1, P2 and P3 are due to coupled range (R) and Velocity (V) information.

According to the exemplary embodiments described herein, the target ranges are decoupled from their corresponding velocity information in the chirp returns such that unambiguous range and velocity information is determined for each target. This decoupling of the range and velocity information according to the exemplary embodiments is illustrated in the bottom portion of the schematic diagram of FIG. 6. Specifically, referring to FIG. 6, each peak P1, P2 and P3 can be associated with one of three possible target velocities V1, V2 and V3. That is, peak P1 can include sampled returns for a target at a first range R11 moving at a velocity V1, at a second range R12 moving at velocity V2 and/or at a third range R13 moving at velocity V3. Peak P2 can include sampled returns for a target at a first range R21 moving at a velocity V1, at a second range R22 moving at velocity V2 and/or at a third range R23 moving at velocity V3. Peak P3 can include sampled returns for a target at a first range R31 moving at a velocity V1, at a second range R32 moving at velocity V2 and/or at a third range R33 moving at velocity V3. Hence, for each peak, according to the exemplary embodiments, the velocity at which the associated target is moving is determined independently from the chirp signal returns, such that the ambiguity related to velocity and range at each FFT peak is eliminated. As a result, both velocity and range for each target are unambiguously determined.

Continuing to refer to FIG. 6, for example, if it is determined in accordance with the exemplary embodiments that the target associated with peak P2 has a velocity V2, then the contribution to the bin associated with peak P2 in the FFT for the paired chirp returns (FIG. 6) attributable to velocity V2 can be removed, such that the range of the target is determined to be R22. Similarly, if, for example, it is determined in accordance with the exemplary embodiments that the target associated with peak P3 has a velocity V1, then the contribution to the bin associated with peak P3 in the FFT for the paired chirp returns (FIG. 6) attributable to velocity V1 can be removed, such that the range of the target is determined to be R31. Similarly, if, for example, it is determined in accordance with the exemplary embodiments that the target associated with peak P1 has a velocity V3, then the contribution to the bin associated with peak P1 in the FFT for the paired chirp returns (FIG. 6) attributable to velocity V3 can be removed, such that the range of the target is determined to be R13.

FIG. 7 includes a schematic diagram which illustrates determination of individual target phase rotations or phase differences from the Doppler velocities in the returns or reflected signals or echo signals from the CW first section of the radar transmitted signal, according to exemplary embodiments. The phase rotations are determined for the peaks V1, V2 and V3 in the FFT. Doppler phase rotations or phase differences Δθ are computed from the velocities V1, V2 and V3. Specifically, phase rotation $\Delta\theta_1$ is determined from velocity V1; phase rotation Δθ2 is determined from velocity V1; and phase rotation $\Delta\theta_3$ is determined from velocity V3. In accordance with exemplary embodiments, the phase rotations with respect to the split chirp determined from the CW returns and the paired chirp sample interval are computed according to the formula $\Delta\theta = 4\pi V T_{S,CHP}/\lambda$, where V is the velocity, $T_{S,CHP}$ is the sampling interval for the paired chirp portion of the signal (see FIG. 4B) and λ is the average or center frequency wavelength of the paired chirp electromagnetic signal. This computation yields the group of expected phase rotations $\Delta\theta_1$, $\Delta\theta_2$ and $\Delta\theta_3$ between the split chirps corresponding respectively to the group of peak velocities V1, V2 and V3 from the FFT for the CW returns, illustrated in FIG. 5A.

FIG. 8 includes a schematic diagram which illustrates determination of individual phase differences ΔΦ among the returns or reflected signals or echo signals from the chirp second section of the radar transmitted signal, according to exemplary embodiments. The phase differences are determined for the peaks P1, P2 and P3 in the FFT results illustrated in FIG. 5B for the samples illustrated in FIG. 4B. Referring to FIGS. 5B and 8, each bin of each FFT includes multiple values, each having a real portion I and an imaginary portion Q. Specifically, bin K1 includes values of the form $I_1+jQ_1$; bin K2 includes values of the form $I_2+jQ_2$; and bin K3 includes values of the form $I_3+jQ_3$. According to exemplary embodiments, a phase Φ is computed for each peak of each of chirp A and chirp B, according to the formula Φ=arctan (Q/I). Specifically, the phases for peaks P1, P2 and P3 of chirp A are computed according to: $\Phi_{A1}$=arctan $(Q_1/I_1)$; $\Phi_{A2}$=arctan $(Q_2/I_2)$; and $\Phi_{A3}$=arctan $(Q_3/I_3)$. Also, the phases for peaks P1, P2 and P3 of chirp B are computed according to: $\Phi_{B1}$=arctan $(Q_1/I_1)$; $\Phi_{B2}$=arctan $(Q_2/I_2)$; and $\Phi_{B3}$=arctan $(Q_3/I_3)$. Phase differences ΔΦ between the chirp A and chirp B FFTs are then computed. Specifically, the phase difference $\Delta\Phi_1$ between the phase $\Phi_{B1}$ for peak P1 in chirp B and the phase $\Phi_{A1}$ for peak P1 in chirp A is computed according to: $\Delta\Phi_1 = \Phi_{B1} - \Phi_{A1}$; the phase difference $\Delta\Phi_2$ between the phase $\Phi_{B2}$ for peak P2 in chirp B and the phase $\Phi_{A2}$ for peak P2 in chirp A is computed according to: $\Delta\Phi_2 = \Phi_{B2} - \Phi_{A2}$; and the phase difference $\Delta\Phi_3$ between the phase $\Phi_{B3}$ for peak P3 in chirp B and the phase $\Phi_{A3}$ for peak P3 in chirp A is computed according to: $\Delta\Phi_3 = \Phi_{B3} - \Phi_{A3}$. It should be noted that the sign of phase differences ΔΦ depends on the lead/lag relationship between the vectors and the Doppler sign convention applied.

According to the preferred embodiments, next, the group of calculated phase differences or phase rotations $\Delta\theta_1$, $\Delta\theta_2$ and $\Delta\theta_3$ corresponding respectively to the group of peak velocities V1, V2 and V3 from the FFT for the CW returns with respect to the paired chirp sample time are compared to the group of phase differences $\Delta\Phi_1$, $\Delta\Phi_2$ and $\Delta\Phi_3$ from the chirp A and chirp B returns to determine the closest matches between the sets of phase differences. According to the preferred embodiments, matching phase differences between the CW returns and the chirp returns would indicate the same detected object/target. With a known phase difference for a target, the velocity of that target can be unambiguously determined from the returns for the CW portion of the transmitted signal. With the velocity known, then range and velocity in the chirp returns are decoupled, and range to the identified target is also unambiguously determined.

FIG. 9 includes a schematic diagram including a table which illustrates the comparison between the calculated phase rotations determined from the CW returns and the phase differences determined from the chirp returns. Referring to FIG. 9, the comparison includes determining the magnitude or absolute value of the differences between each of the phase rotations determined from the CW returns and the phase differences determined from the chirp returns. Where a difference magnitude or absolute value is below a predetermined threshold, a match between a peak P1, P2, P3 and a velocity V1, V2, V3 is declared. In the case of each match, a target associated with the associated chirp peak P1, P2, P3 is concluded to have the associated CW velocity V1, V2 or V3. Closing and opening velocity matches are resolved by the sign of the phase difference ΔΦ.

The relationship between a Doppler frequency $F_{Dop}$ and the velocity V is given by:

$$F_{Dop} = k/Tcw$$

$$V = (F_{Dop} * \lambda)/2$$

where the bin index k=0, . . . , N−1, λ is the CW wavelength, and Tcw is the duration (integration time) of the CW section as shown in FIG. 2.

As described above in connection with FIG. 6, with the velocity of a target determined, the range of the target is then also determined from the full paired chirp signal returns. Specifically, the values in each bin K of the FFT of the paired chirp signal include a velocity contribution and a range contribution. Specifically, the bin number can be defined by:

$$K = (R/dR) + (V/dV),$$

where $$dV = 1/T_{CHP}$$

and $$dR = C/(2*BW) \quad (1)$$

where R is the range (radial), C is the speed of light, $T_{CHP}$ is the paired chirp duration (integration time), BW is the paired chirp bandwidth, dR is the range resolution, e.g., meters/bin, V is the velocity, and dV is the velocity resolution, e.g., meters/sec/bin. According to the exemplary embodiments, at a known peak in the paired chirp, the bin number of the peak is known. Both the velocity resolution dV and range resolution dR are also known. As described above, the velocity at the peak is also known from the pairing and matching described in detail above in connection with FIG. 9. Thus, the range R can be solved for from equation (1) above:

$$R = dR[K - (V/dV)]. \quad (2)$$

Thus, in one exemplary embodiment, velocity resolution dV can be 0.16 meters/sec per bin, and range resolution dR can be 0.83 meters per bin. In this exemplary embodiment, an object at a range R of 20 meters traveling at a relative velocity V of 15 m/sec will have a peak in the FFT bin K, computed by K=(R/dR)+(V/dV)=20/0.83+15/0.16=24.10+93.75=117.85. Therefore, the peak for this object will be in the $118^{th}$ bin of the FFT, rounded to the nearest bin. As an alternative to rounding, a more accurate peak bin determination can be achieved by FFT interpolation and/or curve fitting techniques. Conversely, to illustrate the exemplary embodiments, if the paired chirp (waveform (1) of FIG. 4B) includes a peak P2 at the $118^{th}$ bin of the FFT and the velocity V of the object at the peak P2 is known from the pairing and matching described in detail above in connection with FIG. 9 to be 15 m/sec, with the range resolution dR known to be 0.83 m/bin and the velocity resolution dV known to be 0.16 meters/sec/bin, the range to the object can be computed by equation (2)

to be R=0.83[118−15/0.16]=20.13 meters, which is known to be correct from the posed hypothetical example. It should be noted that the fractional range error is due to rounding off to the nearest bin as opposed to higher-resolution approaches such as FFT interpolation and/or curve fitting with zero padding.

Figure 10A:
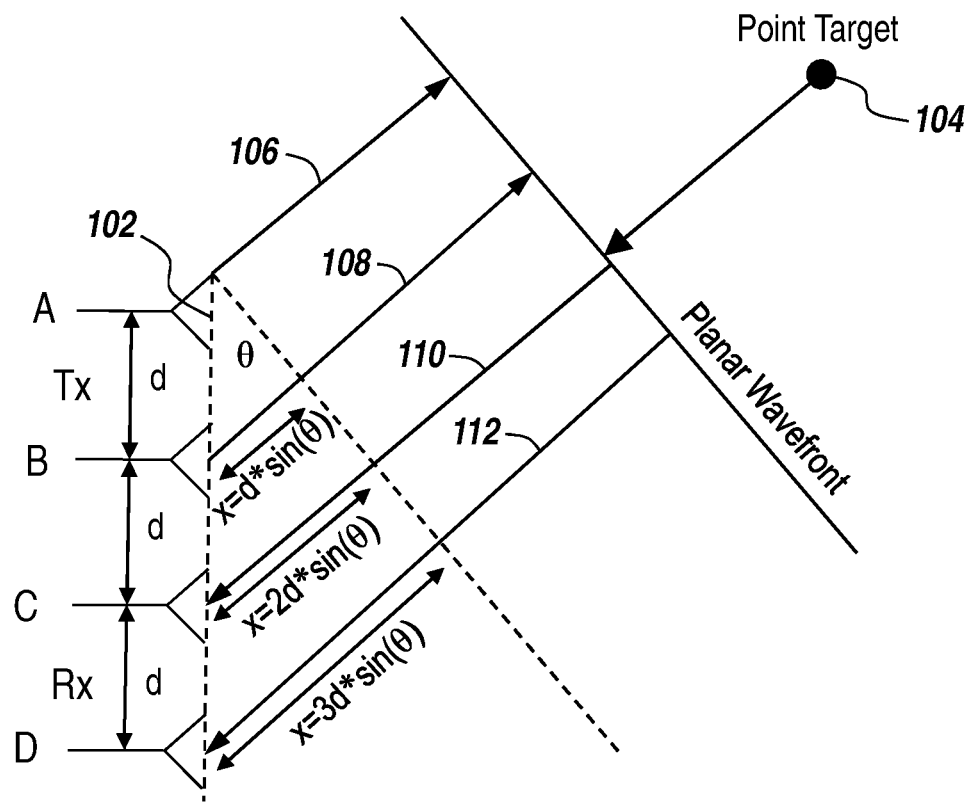
FIG. 10A includes a schematic diagram illustrating antenna elements A, B, C and D of an antenna array used in accordance with some exemplary embodiments.
Figure 10B:
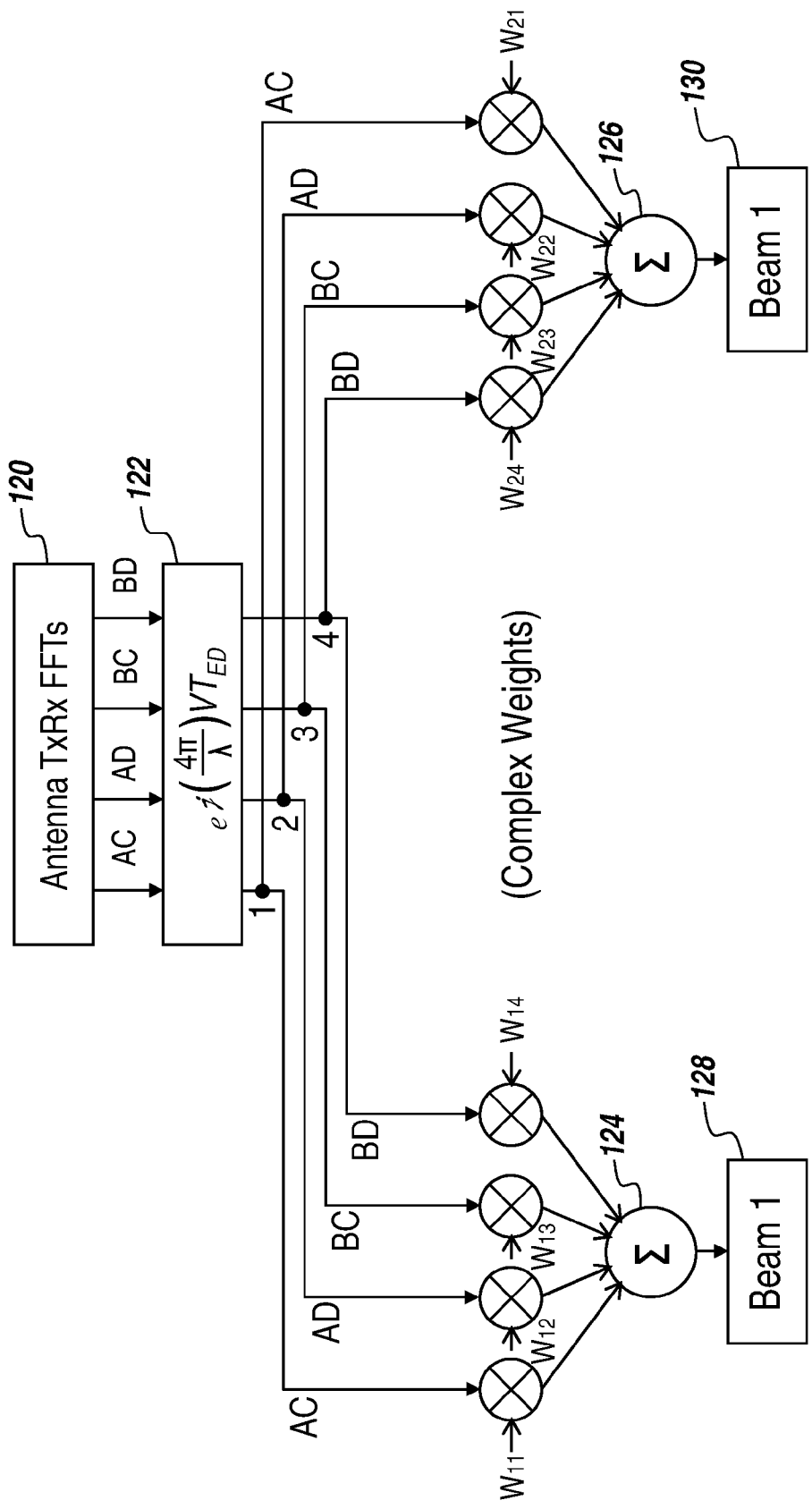
FIG. 10B includes a schematic functional block diagram illustrating a digital beam forming approach used in determination of bearing, according to some exemplary embodiments.
Figure 11:
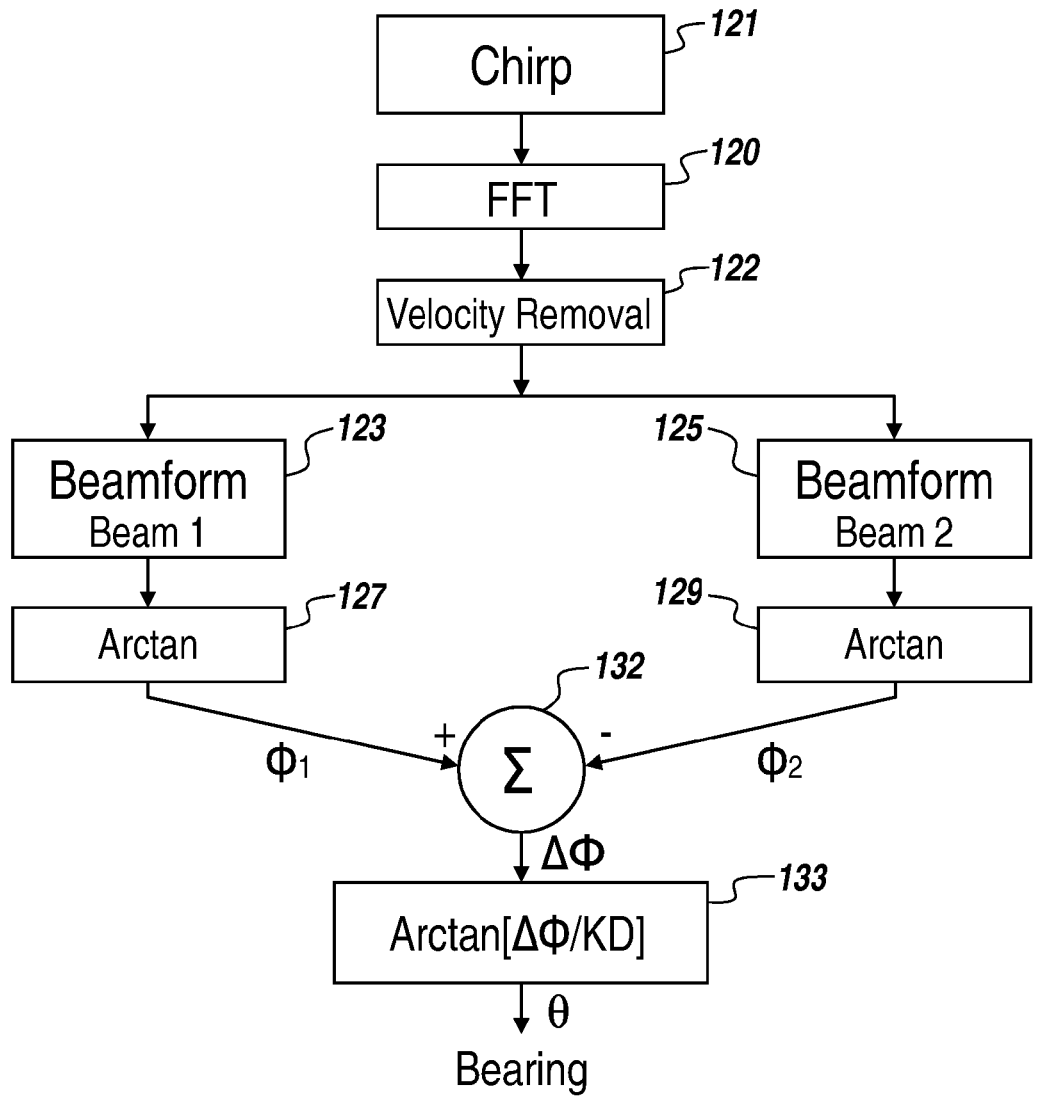
FIG. 11 includes a schematic block diagram of an approach to determining bearing of an object using the antenna array and digital beam forming illustrated in FIGS. 10A and 10B, according to some exemplary embodiments.

With the velocity and range determined according to the exemplary embodiments as described above in detail, the bearing or direction to the target(s)/object(s) can be determined. FIGS. 10A, 10B and 11 include schematic functional block diagrams which illustrate an approach to determining bearing of an object, according to exemplary embodiments. Specifically, FIG. 10A includes a schematic diagram illustrating antenna elements A, B, C and D of an antenna array used in accordance with some exemplary embodiments. FIG. 10B includes a schematic functional block diagram illustrating a beam forming approach used in determination of bearing, according to some exemplary embodiments. FIG. 11 includes a schematic block diagram of an approach to determining bearing of an object using the individual antenna element returns and beam forming illustrated in FIGS. 10A and 10B, according to some exemplary embodiments.

In some exemplary embodiments, bearing is computed by determining the phase difference of the matched peaks between two weighted, beam-formed beams that have been appropriately velocity corrected. Beams can be formed digitally with any of the available sections of the transmitted and received waveforms.

Referring to FIG. 10A, an antenna array system 102 is illustrated. In some exemplary embodiments, such as the illustrative exemplary embodiment illustrated in FIG. 10A, antenna array system 102 includes four antenna elements, labeled A, B, C and D in FIG. 10A. Specifically, antenna array system 102 includes two transmit antenna elements A and B, and two receive antenna elements C and D. It will be understood that the present disclosure applies to any number of antenna elements. Beams 106 and 108 are transmitted by transmit antenna elements A and B, respectively, to an object 104. The beams are reflected by object 104, and, as a result, reflected beams 110 and 112 are received by receive antenna elements C and D, respectively.

Object 104 is assumed to be sufficiently distant from array 102 such that beams 106, 108, 110, 112 can be assumed to be plane waves, as illustrated by the "planar wavefront" in FIG. 10A. In accordance with that assumption, object 104 is referred to in FIG. 10A as a "point target." The bearing of object 104 with respect to array 102 is given by $\theta$, and the distance between elements of array 102 is given by d. Given the element spacing d (assumed uniform here for simplicity but not a requirement), a round-trip difference in path length is defined for each possible combination of transmit and receive elements AC, AD, BC, BD by the relationship between x and $\theta$ given by $x=d\sin\theta$. Specifically, assuming the exemplary uniform element spacing d, the path length difference associated with element B with respect to element A is given by $x=d\sin\theta$; the path length difference associated with element C with respect to element A is given by $x=2d\sin\theta$; and the path length difference associated with element D with respect to element A is given by $x=3d\sin\theta$. The amount of phase rotation due to the extra path length is therefore $2\pi/\lambda$. The path length difference between each element pair also corresponds to a phase difference between the matched peaks of their respective FFTs. Using this information, bearing can be determined mathematically by equating the FFT phases to the geometric element phases and solving for $\theta$.

Referring to FIG. 10B, the FFTs for all four possible paths are computed, as illustrated in box 120. In some exemplary embodiments, the FFTs are computed from the paired chirp signal illustrated in FIG. 4B, signal (1). If simultaneous receive is not implemented then a time element delay, $T_{ED}$, exists between each element pair. Doppler velocities (i.e. relative displacements) will therefore impose additional phase rotations in the FFT which are not present in the physical geometry calculation resulting in erroneous bearing calculations. The velocity components of the FFT samples are therefore removed according to complex velocity vector computation in box 122. It should be noted that the wavelength $\lambda$ referred to in 122 is the average or center frequency wavelength of the chirp. Since the FFT peaks have already been velocity matched, the amount of rotation to be removed is known, therefore, a complex conjugate vector multiply in the frequency domain on the FFT matched peaks will correct the phases. Next, two separate beams are digitally beamformed to yield increased SNR and beam steering capabilities. Data for paths AC, AD, BC, BD are weighted by the application of a first set of complex weights W11, W12, W13, W14, and a second set of complex weights W21, W22, W23, W24. The data weighted by the first set of complex weights are summed in summer 124 to generate Beam 1 as illustrated at 128. Similarly, the data weighted by the second set of complex weights are summed in summer 126 to generate Beam 2 as illustrated at 130.

Referring to FIG. 11, the chirp signal as illustrated in FIG. 4B, signal (1) is transmitted as illustrated in 121, and the FFTs are computed as illustrated at 120. Velocity removal is performed at 122. Beam-forming 123 and 125, including complex weighting and summation described above in connection with FIG. 10B, are performed to generate Beam 1 and Beam 2. Next, for the weighted and summed FFT data, phases $\Phi_1$ and $\Phi_2$ for each matched peak are computed at 127 and 129, respectively, according to the arctangent of the complex FFT data, according to arctan (Q/I) for all of the FFT data. Next, in summer 131, the phase difference $\Delta\Phi$ between $\Phi_1$ and $\Phi_2$ is computed. Next, in 133, the bearing $\theta$ is computed from $\theta=\arcsin(\Delta\Phi/kD)$, where k, the wave number, is given by $k=2\pi/\lambda$, $\lambda$ is the average or center frequency wavelength of the paired chirp, and D is now the calculated virtual spacing between the two beamformed beams, which is derived from the individual element spacings used to form the beam.

Figure 12A:
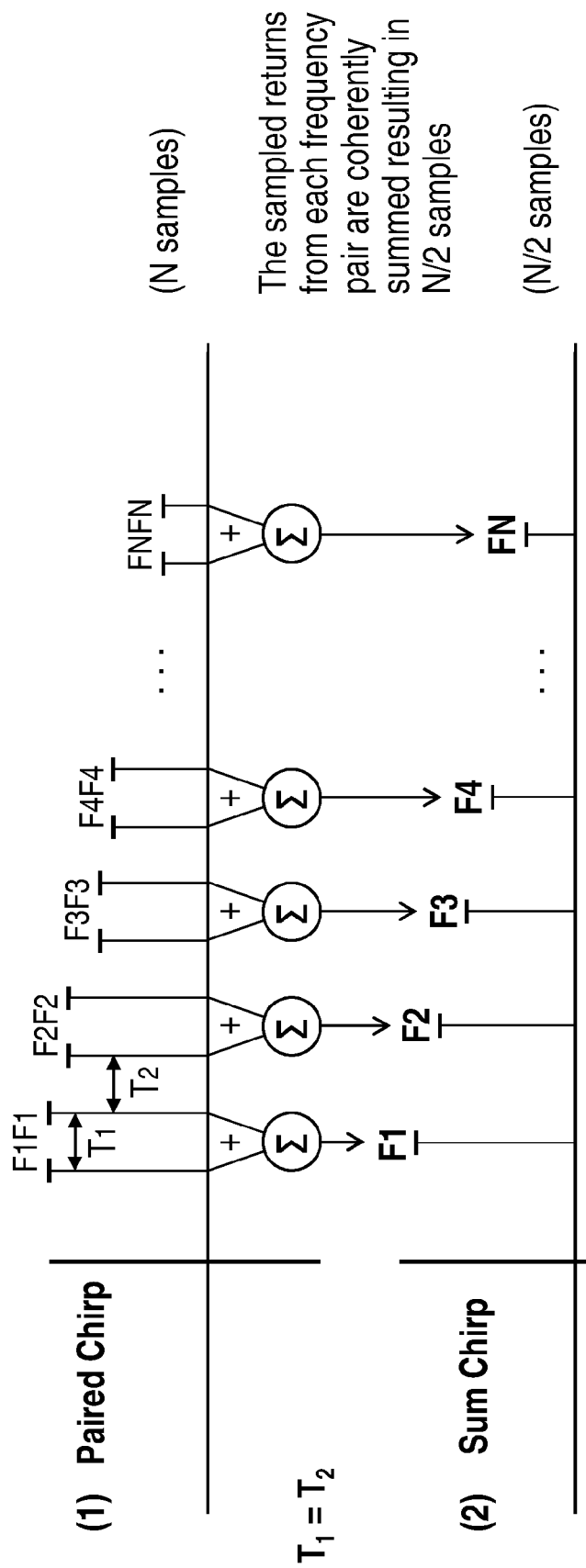
FIG. 12A includes a schematic diagram illustrating a sum chirp signal when the times T1 and T2 are equal, according to some exemplary embodiments.
Figure 12B:
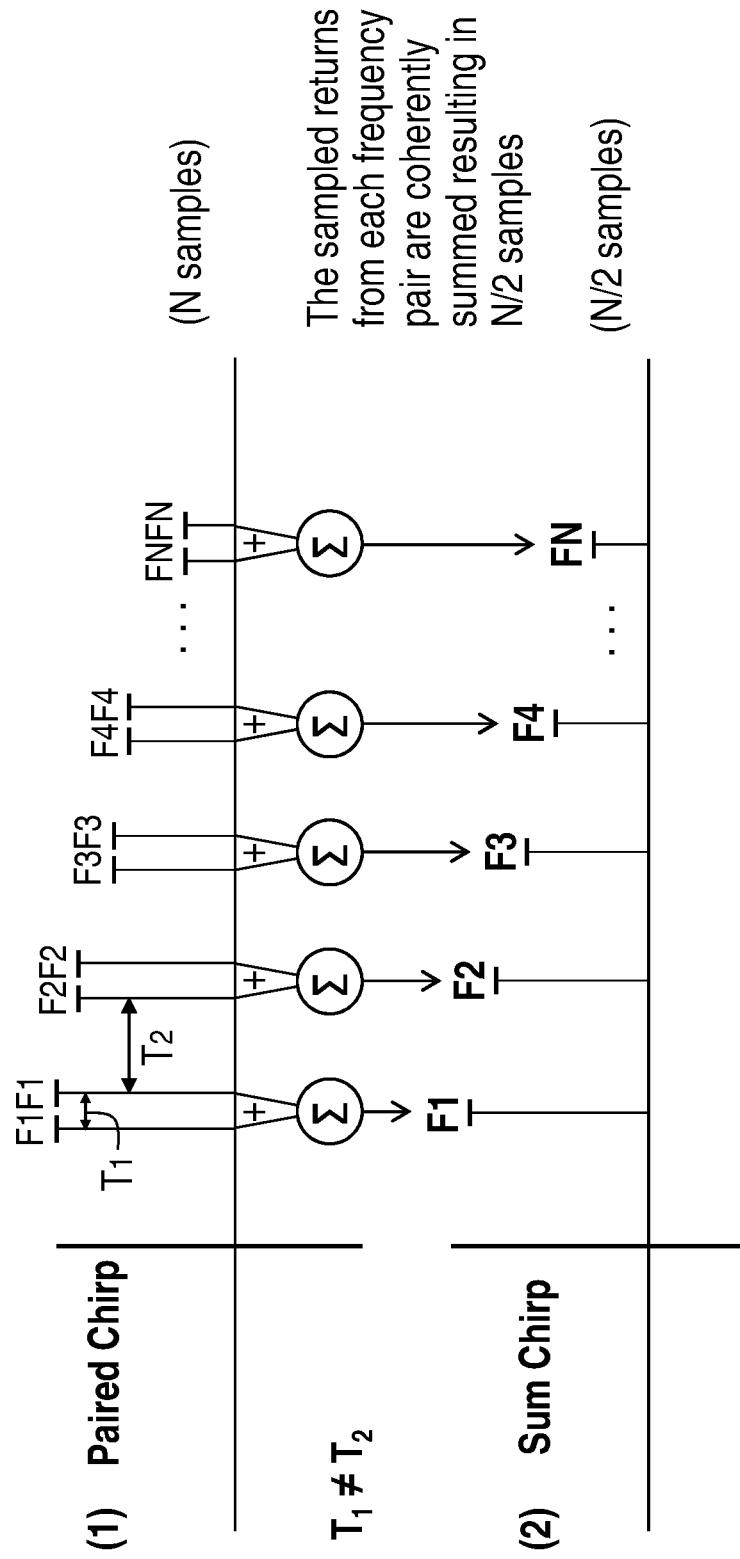
FIG. 12B includes a schematic diagram illustrating a sum chirp signal when the times T1 and T2 are not equal, according to some exemplary embodiments.

Throughout this disclosure, a paired chirp of the type illustrated in FIG. 4B, signal (1), for example, is described. As described above, in the paired chirp signal illustrated in FIG. 4B, signal (1), the time T1 and the time T2 are the same. According to some exemplary embodiments, another type of chirp data processing can be used. This alternative form of chirp processing is referred to herein as "sum chirp" processing. This sum chirp processing is particularly applicable in the exemplary embodiments in cases in which the times T1 and T2 are not equal. FIG. 12A includes a schematic diagram illustrating a sum chirp signal when the times T1 and T2 are equal, according to some exemplary embodiments. FIG. 12B includes a schematic diagram illustrating a sum chirp signal when the times T1 and T2 are not equal, according to some exemplary embodiments.

Referring to FIG. 12A, signal (1) illustrates the paired chirp signal, in which T1=T2. In this case, a constant sampling period can be used to generate N samples for paired chirp signal processing as described above in detail. Signal (2) of FIG. 12A illustrates a sum chirp signal in which like-frequency pulses or instances from the paired chirp signal (1) of FIG. 12A are coherently summed. This results in N/2 samples being generated for sum chirp processing. In FIG. 12B, signal (1) illustrates the paired chirp signal, in which T1≠T2. In this case, a constant sampling period cannot be used to generate N samples for paired chirp signal processing as described above in detail. Signal (2) of FIG. 12B illustrates a sum chirp signal in which like-frequency pulses or instances from the paired chirp signal (1) of FIG. 12B are coherently summed. This results in N/2 samples being generated for sum chirp processing.

Thus, according to the exemplary embodiments, paired chirp processing for target detection and bearing calculations described herein in detail can also or alternatively be performed by summing the paired time samples, resulting in an N/2 sum chirp, as illustrated in the signals (2) in FIGS. 12A and 12B. According to some exemplary embodiments, phase matching for velocity pairing as described herein in detail are still performed on the split chirp and CW signals.

The techniques described in detail herein apply to all combinations of chirp processing. The selection of chirp signal and/or combination(s) of chirp signals depends on signal processing issues such as, for example, noise statistics, signal biases, coherent sum losses due to velocity, FFT bin resolutions, signal averaging options, SNR considerations, timing issues, and other factors.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN)), a private IP network, an IP private branch exchange (IPBX), a wireless network, e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA) network, global system for mobile communications (GSM) network), and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A method for determining parameters of an object with respect to an observation point, comprising:
   transmitting electromagnetic signals from the observation point, said electromagnetic signals being defined by a plurality of sections, a first section of the electromagnetic signals comprising a continuous-wave (CW) electromagnetic signal, a second section of the electromagnetic signals comprising a chirp electromagnetic signal, the chirp electromagnetic signal comprising a plurality of subsections divided in time;
   detecting reflected signals, the reflected signals being the transmitted electromagnetic signals reflected from the object, the reflected signals comprising a reflected CW signal being the CW electromagnetic signal reflected from the object and a reflected chirp signal being the chirp electromagnetic signal reflected from the object, said detecting reflected signals comprising: (i) generating a plurality of samples of the reflected CW signal, and (ii) generating a plurality of samples of the reflected chirp signal;
   determining a first set of phase differences among the plurality of samples of the reflected CW signal;
   determining a second set of phase differences among the plurality of samples of the reflected chirp signal; and
   processing the first and second sets of phase differences to determine the distance and relative speed of the object.

2. The method of claim 1, further comprising performing Fourier transformations on the first and second pluralities of samples and using peaks in the Fourier transformations to determine the first and second sets of phase differences.

3. The method of claim 2, wherein the Fourier transformations comprise a Fast Fourier Transform (FFT).

4. The method of claim 1, wherein:
   the chirp electromagnetic signal and the reflected chirp signal each comprise a plurality of respective associated subsections;
   each subsection of the reflected chirp signal is associated with a pair of consecutive samples of the reflected chirp signal; and
   each sample of the pair of consecutive samples of the reflected chirp signal is respectively associated with a pair of transmitted signals of the same frequency of the associated subsection.

5. The method of claim 4, wherein the plurality of samples of the reflected chirp signal comprises a set of odd chirp samples comprising alternating samples of the plurality of samples of the reflected chirp signal and a set of even chirp samples comprising alternating samples of the plurality of samples of the reflected chirp signal, with a time delay existing between the set of odd chirp samples and the set of even chirp samples.

6. The method of claim 5, wherein determining the second set of phase differences among the plurality of samples of the reflected chirp signal comprises determining phase differences among the set of odd chirp samples and the set of even chirp samples.

7. The method of claim 1, further comprising using a velocity value associated with the object in determining the first set of phase differences.

8. The method of claim 7, further comprising using the velocity value associated with the object and the second set of phase differences to generate a range value associated with the object.

9. The method of claim 8, further comprising generating a bearing value associated with the object.

10. An apparatus for determining distance and relative speed of an object with respect to an observation point, comprising:
    a transmitter for transmitting electromagnetic signals from the observation point, said electromagnetic signals being defined by a plurality of sections, a first section of the electromagnetic signals comprising a continuous-wave (CW) electromagnetic signal, a second section of the electromagnetic signals comprising a chirp electromagnetic signal, the chirp electromagnetic signal comprising a plurality of subsections divided in time;
    a detector for detecting reflected signals, the reflected signals being the transmitted electromagnetic signals reflected from the object, the reflected signals comprising a reflected CW signal being the CW electromagnetic signal reflected from the object and a reflected chirp signal being the chirp electromagnetic signal reflected from the object, said detector detecting the reflected signals by: (i) generating a plurality of samples of the reflected CW signal, and (ii) generating a plurality of samples of the reflected chirp signal; and
    a processor for determining a first set of phase differences among the plurality of samples of the reflected CW signal, determining a second set of phase differences among the plurality of samples of the reflected chirp signal, and processing the first and second sets of phase differences to determine the distance and relative speed of the object.

11. The apparatus of claim 10, wherein the processor performs Fourier transformations on the first and second pluralities of samples and uses peaks in the Fourier transformations to determine the first and second sets of phase differences.

12. The apparatus of claim 11, wherein the Fourier transformations comprise a Fast Fourier Transform (FFT).

13. The apparatus of claim 10, wherein:
    the chirp electromagnetic signal and the reflected chirp signal each comprise a plurality of respective associated subsections;
    each subsection of the reflected chirp signal is associated with a pair of consecutive samples of the reflected chirp signal; and
    each sample of the pair of consecutive samples of the reflected chirp signal is respectively associated with a pair of transmitted signals of the same frequency of the associated subsection.

14. The apparatus of claim 13, wherein the plurality of samples of the reflected chirp signal comprises a set of odd chirp samples comprising alternating samples of the plurality of samples of the reflected chirp signal and a set of even chirp samples comprising alternating samples of the plurality of samples of the reflected chirp signal, with a time delay existing between the set of odd chirp samples and the set of even chirp samples.

15. The apparatus of claim 14, wherein the processor determines the second set of phase differences among the plurality of samples of the reflected chirp signal by determining phase differences among the set of odd chirp samples and the set of even chirp samples.

16. The apparatus of claim 10, wherein the processor determines the first set of phase differences using a velocity value associated with the object.

17. The apparatus of claim 16, wherein the processor uses the velocity value associated with the object and the second set of phase differences to generate a range value associated with the object.

18. The apparatus of claim 17, wherein the processor generates a bearing value associated with the object.

\* \* \* \* \*